United States Patent [19]

Leitner

[11] 3,889,733
[45] June 17, 1975

[54] SCREW-THREADED FASTENING MEMBERS

[76] Inventor: Kajetan Leitner, 18 Am Winacker, Bad Tolz D-817, Germany

[22] Filed: Nov. 28, 1973

[21] Appl. No.: 419,664

[30] Foreign Application Priority Data
Dec. 1, 1972  Austria .............. 10250/72

[52] U.S. Cl. ............................. 151/41.73
[51] Int. Cl. ............................. F16b 39/00
[58] Field of Search ........... 151/41.73, 41.72, 41.74, 151/41.7; 85/32 K; 29/521, 520, 432; 10/86 R, 86 A

[56] References Cited
UNITED STATES PATENTS

| | | |
|---|---|---|
| 1,062,635 | 5/1913 | Clements .................. 151/41.7 X |
| 1,131,399 | 3/1915 | McGinley .................. 151/41.7 X |
| 1,447,515 | 3/1923 | Miller ....................... 151/41.73 |
| 3,311,148 | 3/1967 | Leitner ..................... 151/41.73 |
| 3,348,596 | 10/1967 | Leitner ..................... 151/41.73 |

Primary Examiner—Ramon S. Britts
Attorney, Agent, or Firm—Anthony A. O'Brien

[57] ABSTRACT

A press-fitted nut, or like screw-threaded fastening member such as a bolt-head, of the kind comprising a body with base projections and a crown with conical sectors, to engage in the wall of a mounting bore, has the base projections and conical sectors staggered angularly and spaced apart axially so as to form, in effect, a circumferential groove around the nut.

6 Claims, 6 Drawing Figures

PATENTED JUN 17 1975 3,889,733

SHEET 1

SCREW-THREADED FASTENING MEMBERS

This invention relates to press-fitted nuts and like screw-threaded fastening members, such as bolt-heads, which may each be pre-mounted in a structural part, such as a sheet-metal wall, by being pressed into a cylindrical bore in such part.

A nut of this kind is known from my U.S. Pat. No. 3,311,148, issued Mar. 28, 1967, and typically comprises a body with flat base projections surmounted by a milled conical collar or crown which is inset from the base projections and has spaced rim parts, corresponding in number to the base projections, with a radius equal to or less than the radius of the mounting bore into which the nut is to be press-fitted.

When such a nut is pressed into its mounting bore, the conical crown deforms the wall of the bore and is tightly gripped thereby.

If the nut is then turned in the same direction as a bolt would be screwed in, its milled conical surfaces thrust the surrounding material aside leaving undisturbed material, between the rim of the crown and the base projections, behind which the crown anchors and holds the nut fast in its mounting bore.

In order to leave undisturbed the bore wall material between the rim of the crown and the base projections, a groove is required and this can be turned in a lathe, using an under-cutting tool.

Mass production of nuts which each had to be turned in a lathe would be very costly and the present invention aims at eliminating such a turning operation.

According to the invention, a screw-threaded fastening member, to be mounted by press-fitting in a bore in a structural part, comprises a substantially cylindrical body from which are pressed at one end radially extending base projections and at the other end conical sectors of a crown, the base projections and conical sectors alternating angularly, without overlapping around the body, and being spaced apart axially of the body.

Due to this staggered arrangement of the base projections and conical sectors they may both be pressed or formed from a substantially cylindrical blank of which the undeformed part remains as the substantially cylindrical body. It will of course be apparent that the body, and the blank from which the fastening member is pressed, need not be exactly or entirely of circular cylindrical form but could have a polygonal or prismatic shape, particularly between the base projections, so long as it can be pressed into and turned to grip in a mounting bore.

In order to enhance tight gripping of the fastening member in its mounting bore, the underledges of the conical sectors may be slightly inclined somewhat helically, in the opposite direction to the screw-thread. When the fastening member is turned to grip in its mounting bore, the inclined underledges act as ramps to draw the member more tightly into its mounting bore.

A nut in accordance with the invention is illustrated, by way of example, on the accompanying drawings, in which.

Figure 1:
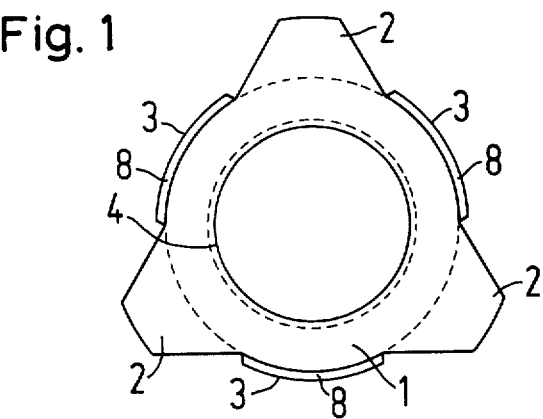
FIG. 1 is an inverted plan, showing the nut as seen axially from its base end.

The nut as shown comprises a substantially cylindrical body 1 from one end of which three base projections 2 are pressed or formed and from the other end of which are pressed or formed three conical sectors 3 which alternate in angular orientation with the projections 2 so as not to overlap them. Between the projections 2 and sectors 3 the body 1 retains its cylindrical shape.

The conical surfaces of the sectors 3 are milled with ridges sloping in the appropriate direction with respect to the pitch of the screw-thread 4 of the nut.

Circumferentially between and below the conical sectors 3, the cylindrical body forms a crown 5, projecting from the plane of the surfaces 6 of the base projections 2, with interstices 7 between the underledges 8 of the sectors 3 and the plane, indicated by the broken line 9, of the surfaces 6.

There is thus obtained, in effect, a circumferential groove 10 which has, at any one time, only one side wall formed by an underledge 8 or a surface 6 alternately on opposite sides.

The desired equivalent of a turned groove is thus achieved. When the nut is pressed, crown end first, into its mounting bore and is then turned, the conical sectors individually become anchored in a hitherto undeformed portion of the bore-wall, which remains undisturbed around the effective groove 10, and the nut thereby becomes an exceptionally tight fit in the bore.

Figure 2:
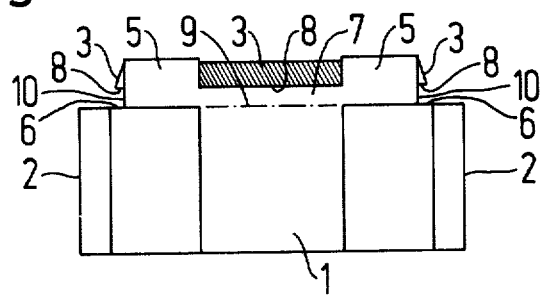
FIG. 2 is a side elevation.
Figure 3:
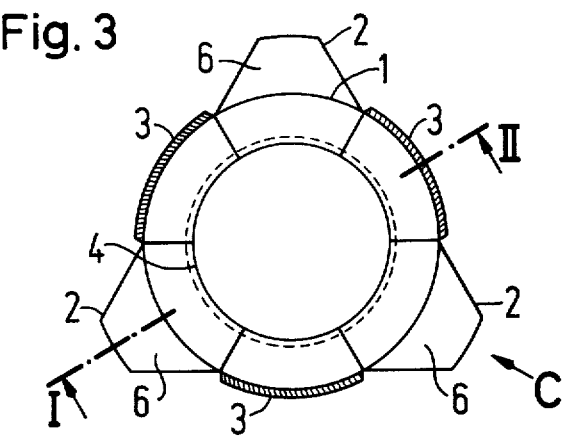
FIG. 3 is a plan, showing the nut as seen axially from its crown end.
Figure 4:
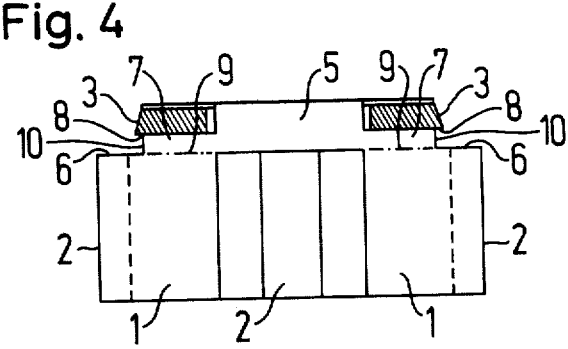
FIG. 4 is a further side elevation, as seen in the direction of the arrow C on FIG. 3.
Figure 5:
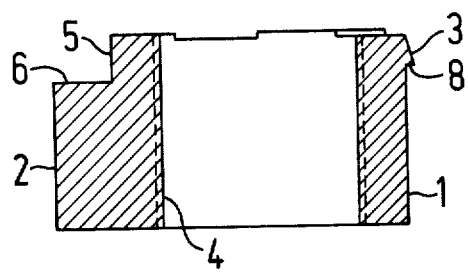
FIG. 5 is a cross section, on the line I – II of FIG. 3.

In this embodiment, the portions of the crown 5 between the sectors 3 must have a radius which is equal to or less than the radius of the intended mounting bore and the size of the body 1, which determines such radius of the crown, must therefore be selected to fit in the bore. As can be seen in FIG. 2, the portions of the crown 5 between the sectors 3 are left axially protruding slightly and thus serve as leading lugs which centre the nut in the mouth of the bore before the nut is pressed in.

As those parts 2 and 3 which are pressed out from the body are staggered, it is possible to form them simply by axial pressure or impact without one interfering with another. For this purpose there may be used a die which holds and supports the body 1 in the regions between the conical sectors and base projections respectively. For such a die it is not necessary to have laterally withdrawable inserts which would be necessary if the conical sectors 3 and base projections 2 were axially aligned. The inclined faces of the conical sectors 3 can be formed at the same time as the sectors and base projections.

Figure 6:
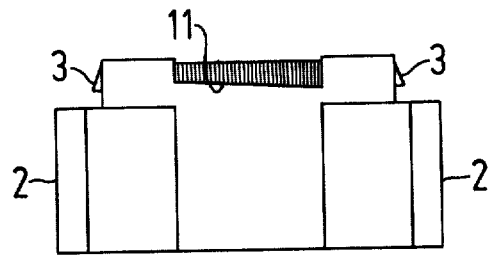
FIG. 6 is a side elevation corresponding to FIG. 2 but showing the modification of inclined underledges of the conical sectors.

A modified form of nut is shown by FIG. 6 with the conical sectors 3 having underledges 11 substantially helically inclined in the corresponding direction to the screw-thread of the nut. When the nut is turned in its mounting bore, the inclination of the underledges 11 produces an enhanced axial tightening effect and furthermore inclined milling on the conical sectors is then not necessary. Straight milling will do because the axial tightening of the nut is achieved by the inclined underledges 11. The inclined shape of the underledges 11 can be pressed or formed simultaneously with the conical sectors, the wall of the die for this purpose having a suitably shaped opposing abutment.

The nut may have only two sets of conical sectors and base projections or more than three sets, in particular four sets. Also the form of the body of the nut between the base projections need not be cylindrical and could, for example, have flats so that it is polygonal or prismatic.

Although the invention has been described and illustrated as applied to a nut, it is applicable to other screw-threaded fastening members. For example the same form could be applied to the head of a bolt having a screw-threaded stem. This stem may have a diameter to pass freely through a mounting bore for the bolt head and project from the further side of a structural part, such as a sheet metal wall.

I claim:

1. A screw-threaded fastening member, to be mounted in a bore in a structural part, comprising a nut having a substantially cylindrical body from one end of which is formed at least two radially extending base projections the upper surfaces of which are in a common transverse plane, a crown portion of said substantially cylindrical body projecting axially above said plane, at least two conical sectors being formed from said crown portion and alternating angularly with said base projections so as not to overlap therewith around said nut, and said conical sectors having radially projecting underledges spaced axially from said plane and forming with said upper surfaces of said base projections in effect a circumferential groove about the crown portion, the groove which has opposed side portions formed by the underledges of the conical sectors and the upper surfaces of the base projections circumferentially alternating about the groove.

2. A screw-threaded fastening member according to claim 1, in which portions of the crown portion between the conical sectors protrude slightly axially above the conical sectors to serve as leading means to enter the crown portion in the mouth of a mounting bore.

3. A screw-threaded fastening member according to claim 1, in which the underledges of the conical sectors are substantially helically inclined.

4. A screw-threaded fastening member according to claim 1 wherein said body has an internally threaded bore.

5. A screw-threaded fastening member according to claim 1 wherein the conical sectors have outer surfaces; and the outer surfaces include ridge means.

6. A screw-threaded fastening member according to claim 5 wherein said body has an internally threaded bore, the ridge means on each of the sectors being inclined relative to the pitch of the internally threaded bore.

* * * * *